Nov. 23, 1965    S. A. ZARLENG    3,219,908
GATE CONTROL CIRCUIT
Filed Jan. 3, 1961

INVENTOR.
STEVE A. ZARLENG
BY Charles Putnam 3,219,908
GATE CONTROL CIRCUIT
Steve A. Zarleng, Akron, Ohio, assignor to The Clark Controller Company, Cleveland, Ohio, a corporation of Ohio
Filed Jan. 3, 1961, Ser. No. 80,439
15 Claims. (Cl. 321—45)

My invention relates to control circuits and more particularly to control circuits for controlling silicon controlled rectifiers.

It is therefore the primary object of my invention to provide a control circuit for controlling the current to the gate of a silicon controlled rectifier and thereby control the current conducted by the silicon controlled rectifier.

It is another object of my invention to provide a control circuit for controlling the silicon controlled rectifier over its entire conducting range.

It is another object of my invention to provide a control circuit whereby the gate of the silicon controlled rectifier is energized by a pulse of current.

It is another object of my invention to provide a pulse producing circuit whereby a current pulse may be produced at any preselected instant during like polarity half cycles of an alternating current source.

It is another object of my invention to provide a pulse producing circuit where the pulse may be isolated from and not affected by the exciting current of the pulse producing circuit.

It is a further object of my invention to provide a control circuit whereby the gate of the silicon controlled rectifier is not energized by the exciting current of the control circuit.

It is a still further object of my invention to provide a control circuit for controlling the silicon controlled rectifier using isolated electric control signals.

It is still another object of my invention to provide a control circuit utilizing a saturable reactor whereby the silicon controlled rectifier is not adversely affected by the negative ampere turns of the saturable reactor's control windings.

The above and other objects of my invention will be made apparent to those skilled in the art when taken in consideration with the following specifications and the accompanying drawings in which.

The present invention is directed toward a control circuit for producing a pulse of current and a second control circuit for transmitting the pulse of current to the gate of the silicon controlled rectifier.

The pulse producing circuit comprises a source of alternating current, a unidirectional conducting device, a resistor, a condenser connected in parallel with the resistor, the winding of a reactor, and the primary winding of a saturable current transformer all connected in series. The reactor has control windings on it which are energized by D.C. control signals to preset the flux level in the reactor.

During the half cycle current can flow through the unidirectional conducting device and the circuit and while the reactor is unsaturated, the reactor winding will have a high impedance and absorb most of the voltage from the source. Therefore, only a small exciting current will flow through the circuit.

When the reactor becomes saturated, the impedance of its winding becomes low and the voltage absorbed by it is proportionally reduced. Therefore, the major portion of the voltage from the source is absorbed by some of the other elements connected in the circuit; namely, the parallel connected condenser and resistor. Therefore, the current flowing through the circuit is increased. For a short instant after the impedance of the reactor winding has decreased, a surge of current flows through the circuit to charge the condenser to the new value of voltage across it.

The surge of current charging the condenser reverses the flux in the saturable current transformer to induce a pulse of current in its secondary winding. The secondary has one side connected by a unidirectional conducting device to the gate of a silicon controlled rectifier. The other side of the secondary winding is connected to the cathode of the silicon controlled rectifier.

When the gate of the silicon controlled rectifier is energized with the pulse of current, the silicon controlled rectifier becomes conductive and conducts current through its anode cathode circuit. It will remain conductive until a negative potential is applied to its anode, as is well known in the art of silicon controlled rectifiers.

In another embodiment of my invention, the gate cathode circuit of the silicon controlled rectifier is connected in place of the primary winding of the saturable current transformer. The silicon controlled rectifier is made conductive by the pulse of current. However, in this circuit, the gate cathode circuit is energized by the exciting current even though it is not enough to make it conductive.

Figure 1:
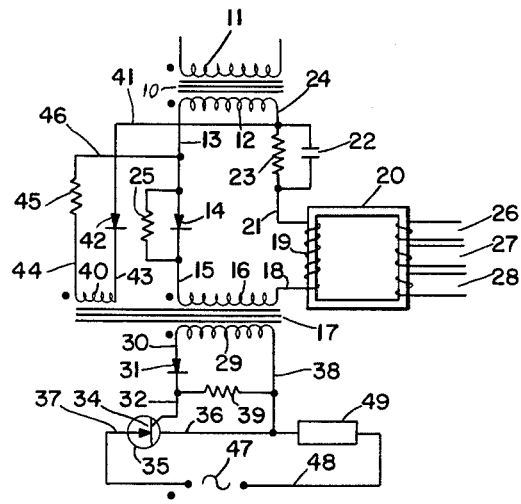
FIGURE 1 is a schematic representation of a pulse producing circuit for energizing the gate of a single silicon controlled rectifier.

With reference to the drawings, there is shown in FIGURE 1 a transformer 10 having a primary winding 11 connected to a source of alternating current and a secondary winding 12.

During the half cycle that the left side of secondary winding 12, as viewed, is positive, current will flow therefrom through a wire 13, a rectifier 14, a wire 15, a primary winding 16 of a saturable current transformer 17, a wire 18, a reactor winding 19 wound on a reactor 20, a wire 21, a resistor 23, and a wire 24 to the other side of secondary winding 12.

A resistor 25 is connected in parallel with rectifier 14. Therefore, in the other half cycle, current can flow in the reverse direction through the described path; but, because the value of resistor 25 is high, the current flow will be extremely small. The purpose of resistor 25 is to reduce the sensitivity of the circuit as will be described later.

A condenser 22 is connected in parallel with resistor 23 for purposes to be described.

Reactor 20 also has control windings 26, 27 and 28 wound thereon, the purpose of which will be described in more detail hereinafter.

Saturable current transformer 17 has a core with appreciable remanence so that when it is saturated in one direction, it remains in that condition until saturated in the opposite direction. It is only when its flux is reversed to change the saturation from one direction to the other that a current is induced in its secondary winding. Further, saturable current transformer 17 requires high exciting current value. This requires that a current of relative high value flow through primary winding 16 before the flux is reversed and the saturation changed from one direction to the other.

Saturable current transformer 17 has a secondary winding 29 which has one side connected by a wire 30, a rectifier 31, and a wire 32 to the gate 34 of a silicon controlled rectifier 35. Rectifier 31 is connected so current can only flow through the aforedescribed path from secondary winding 29 to gate 34.

Silicon controlled rectifier 35 also has a cathode 36 and an anode 37. Cathode 36 is connected by a wire 38 to the other side of secondary 29.

A resistor 39 is connected across wires 32 and 38 and serves to improve the operation of silicon controlled rectifier 35 by reducing its forward leakage current. It has been found that the more recent silicon controlled rectifiers do not require the use of this resistor.

Saturable current transformer 17 has a secondary primary winding 40 which is connected to be energized during the half cycle that the right side of secondary winding 12, as viewed, is positive. Current flows from secondary winding 12 through wire 24, a wire 41, a rectifier 42, a wire 43, primary winding 40, a wire 44, a resistor 45, a wire 46 and wire 13 to the other side of secondary 12. Current cannot flow in the other half cycle because of the blocking action of rectifier 42.

Silicon controlled rectifier 35 has anode 37 connected to one side of an alternating current source 47. The other side of alternating current source 47 is connected by a wire 48, and a load 49 to cathode 36.

The transformers and current sources are connected so that the sides having the dot adjacent thereto will have the same polarity during the same half cycle. Further, it will be assumed that the control windings 26, 27 and 28 are all connected to be energized from separate signal sources of D.C. current to preset the flux level of reactor 20. Normally, this flux level will be less than saturation.

During the half cycle that the polarity of the dots is positive, an exciting current will flow from secondary winding 12 through wire 13, rectifier 14, wire 15, primary winding 16, wire 18, reactor winding 19, wire 21, resistor 23 and wire 24 to the other side of secondary winding 12. Since reactor 20 is unsaturated, reactor winding 19 has a high impedance to absorb most of the voltage from the source. Therefore, the value of the exciting current that does flow is small, as is the voltage drop across resistor 23.

It is to be noted that this value of the exciting current flowing through primary winding 16 is not sufficient to reverse the flux and induce a flow of current in secondary winding 29.

When reactor 20 becomes saturated due to the large voltage drop across its winding 19 and the consequential current flowing therethrough, the impendance of reactor winding 19 changes from a very high value to a very low value.

As this occurs, the voltage drop across reactor winding 19 becomes small and the voltage drop across resistor 23 becomes large. Further, decrease in the impedance of reactor winding 19 decreases the total impedance of the circuit. This causes the current flowing through the circuit to be increased.

Reactor 20 and reactor winding 19 can be designed so the aforedescribed change in current would be sufficient to reverse the flux of saturable current transformer 17 and induce a current in secondary winding 29. However, to obtain greater accuracy in the control of the silicon controlled rectifier throughout its conducting half cycle and to allow the use of a standard inexpensive reactor, condenser 22 is connected in parallel with resistor 23. Therefore, when the large voltage drop is removed from reactor winding 19 and applied to resistor 23, a relative high surge of current will flow through the circuit to charge condenser 22 to the voltage across it. The current surge flows only for an instant and is then reduced to the lower value. The value of this surge of current is obvious when it is necessary to make the silicon controlled rectifier 35 conductive at the beginning or end of its conducting half cycle.

The flow of the surge of charging current through primary winding 16 is sufficient to cause the flux in saturable current transformer 17 to be reversed in the opposite direction. This induces a pulse of current in secondary winding 29. As described, transformer 17 is a saturable current transformer with appreciable remanence and the flux in its core will remain as last created until it is reversed by current creating a flux in the opposite direction. The accomplishment of this will be described later.

The pulse of current induced in secondary winding 29 flows therefrom through wire 30, rectifier 31, wire 32, gate 24 and cathode 36 of silicon controlled rectifier 35, and wire 38 back to secondary winding 29.

Silicon controlled rectifier 35 is thereby made conductive and current will flow from source 47 through anode 37 and cathode 36 of silicon controlled rectifier 35, load 49 and wire 48 back to source 47. Silicon controlled rectifier 35, as is well known, will continue to conduct this current to the load until the end of the half cycle when its anode 37 becomes negative. Therefore, during the next half cycle silicon controlled rectifier 35 cannot conduct current, except for leakage current, even though its gate 34 may be energized with current.

During the next half cycle which is the resetting half cycle and when the polarity of the dots are negative, an extremely small current will flow from primary winding 12 through resistor 23, wire 21, reactor winding 19, wire 18, primary winding 16, wire 15, resistor 25, and wire 13 to the other side of secondary winding 12. This current is extremely small because of the value of resistors 23 and 25.

This small current flow through reactor winding 19 assists the currents flowing in control windings 26, 27 and 28 to reset the flux level of reactor 20 to its preset level. By doing this, the small current decreases the sensitivity of reactor 20 to increase the accuracy of controlling the silicon controlled rectifier through its conducting half cycle.

Also during the resetting half cycle, condenser 22 discharges through resistor 23 and the time constant of this circuit is such that condenser 22 will be discharged before the start of the next conducting half cycle.

Also during the resetting half cycle, it is necessary to reset saturable current transformer 17 which is accomplished as follows. Current will flow from the right side of secondary winding 12 through wire 24, wire 41, rectifier 42, wire 43, primary winding 40, wire 44, resistor 45, wire 46 and wire 13 back to the left side of secondary winding 12. The flow of this current through the described circuit is sufficient to reverse the flux in transformer 17 and it is thereby reset. The reversal of the flux in transformer 17 also induces a pulse of current in the secondary winding 29 but of the reversed polarity. This current is not allowed to flow through it to the gate cathode circuit because of the blocking action of rectifier 31. Again, it has been found that the use of rectifier 31 is not required when some of the more recently developed silicon controlled rectifiers are used.

Therefore, gate 34 of silicon controlled rectifier 35 is not energized with current during this, the resetting half cycle.

At the start of the next half cycle or conducting half cycle when the polarity of the dots again become positive, the aforedescribed action will take place and at the preselected instant gate 34 will be energized with current. This preselected instant in the half cycle that gate 34 is energized with current can be varied by changing the preset flux level in reactor 20. This is accomplished by changing the current energizing control windings 26, 27 and 28; or any one of them.

While I have shown only three control windings for reactor 20, it is understood that any practical number may be used.

It is to be noted that gate 34 of silicon controlled rectifier 35 is energized with a mere pulse of current. These pulses of current are sufficient to cause silicon controlled rectifier 35 to become conductive. The use of a pulse of current is desirous because it gives a very accurate and positive firing control and also reduces the power delivered to the gate. Therefore, with reduced power, the heating of the gate is greatly reduced.

Further, it has been described how the pulse may be created at different times in the half cycle and therefore control the current conducted by the silicon controlled rectifier 35 throughout the half cycle.

It is also seen that by using a saturable current transformer, such as current transformer 17, the exciting current flowing through winding 19 of reactor 20 does not flow through gate 34. This eliminates the possibility of false firing of silicon controlled rectifier 35 due to this current. Further, the elimination of this current flowing through gate 34 reduces the heating of silicon controlled rectifier 35.

Again, in many instances it is necessary to use negative ampere turns on reactor 20 by means of the control windings 26, 27 and 28. It is well known that a reactor in a magnetic amplifier circuit will act as a saturable reactor when energized by a large number of negative ampere turns. Therefore, if saturable current transformer 17 were not used and the circuit connected directly to gate 34 of silicon controlled rectifier 35, silicon controlled rectifier 35 could be caused to become conductive by the current resulting from negative ampere turns. This would not be desirable and would have an adverse and harmful affect upon the control system.

By use of saturable current transformer 17, this is eliminated because, as described, its exciting current is selected quite high and therefore an extremely large amount of negative ampere turns must be present to allow enough current to flow through reactor winding 19 and primary winding 16 to reverse the flux in saturable current transformer 17 and produce a current pulse in secondary winding 29. Therefore, while the use of saturable current transformer 17 does not completely eliminate the adverse affect of negative ampere turns, it does reduce it to a practical working level.

Figure 3:
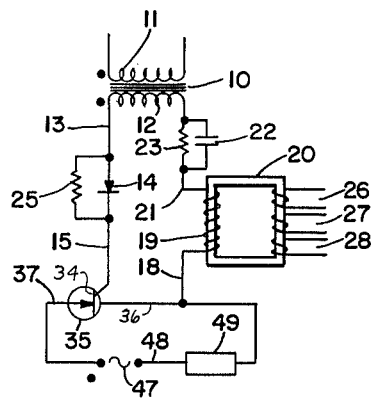
FIGURE 3 is a schematic representation of a circuit directly energizing the gate of a silicon controlled rectifier.

If these features are not required by the control system, the gate 34 cathode 36 can be connected to the circuit in place of primary winding 16, as shown by FIGURE 3. The circuit now operates as follows. Like parts are given the same reference numerals as in FIGURE 1.

During the half cycle that the dots are positive, exciting current flows from the left side of secondary winding 12 through wire 13, rectifier 14, wire 15, gate 34 and cathode 36, wire 18, reactor winding 19, wire 21, resistor 23, and wire 24 to the other side of secondary winding 12.

The value of the exciting current is small and its energization of gate 34 is not sufficient to cause silicon controlled rectifier 35 to become conductive.

As described for FIGURE 1, when reactor 20 saturates, a relative high surge of current flows through the circuit to charge condenser 22 for a short instant.

This surge of current flowing through the gate 34 cathode 36 circuit is sufficient to fire silicon controlled rectifier 35 and it becomes conductive. Current then flows from source 47 through anode 37, cathode 36, load 49 and wire 48 to the other side of source 47.

At the start of the next half cycle, which is the resetting half cycle, silicon controlled rectifier 35 stops conducting because its anode 37 becomes negative.

During the resetting half cycle, current flows in the reverse direction through the above described path because of resistor 25 being connected in parallel with rectifier 14 as described for FIGURE 1.

Also as described for FIGURE 1, condenser 22 discharged through resistor 23 during this resetting half cycle.

Therefore, it is seen that the operation of the circuit of FIGURE 1 is quite similar to the operation of FIGURE 3, except that in FIGURE 3, the exciting current for the pulse producing circuit does flow through the gate cathode circuit, while in FIGURE 1 it does not. Also, there are other operational advantages described for FIGURE 1 which are not obtained in FIGURE 3.

Figure 2:
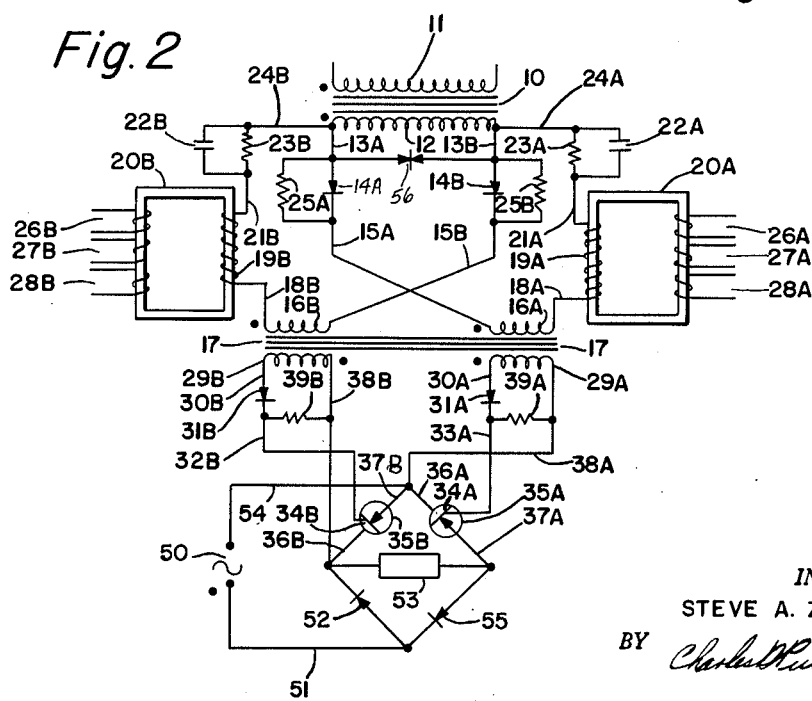
FIGURE 2 is a schematic representation of two symmetrical pulse producing circuits, each circuit is connected to energize the gate of an individual silicon controlled rectifier.

FIGURE 2 illustrates the use of two symmetrical circuits similar to that of FIGURE 1. These circuits are connected together in a manner whereby they control the gates of two silicon controlled rectifiers allowing their use in a full wave rectifying bridge. The like parts of FIGURE 1 that are used in FIGURE 2 are given the same reference numeral with the suffix A added for one circuit and the suffix B added for the second circuit. Again, the dots adjacent to the transformer windings and the power sources will indicate that they all have the same polarity during the same half cycle.

The control windings for reactors 20A and 20B having the same reference numeral should be connected in series, not shown, so that they are energized with the same current. That is: control windings 26A and 26B should be connected in series, control windings 27A and 27B should be connected in series, and control windings 28A and 28B should be connected in series. Therefore, reactors 20A and 20B should have the same preset flux level.

During the half cycle that the polarity of the dots are positive, one of the symmetrical circuits will be in its gate controlling half cycle and the other symmetrical circuit will be in its resetting half cycle.

During the half cycle the polarity of the dots is positive, exciting current will flow from secondary winding 12 through wire 13A, rectifier 14A, wire 15A, winding 16A, wire 18A, reactor winding 19A, wire 21A, resistor 23A and wire 24A to the right side of secondary winding 12. As described for FIGURE 1, this small exciting current continues to flow until reactor 20A becomes saturated, at which time a surge of current flows to charge condenser 22A. This surge of current reverses the flux in saturable current transformer 17 to induce a pulse of current in secondary winding 29A. This current flows from one side of secondary winding 29A through wire 30A, rectifier 31A, wire 32A to gate 34A of silicon controlled rectifier 35A and back through cathode 36A and wire 38A to the other side of secondary winding 29A.

Therefore, current can flow from alternating current source 50 through a wire 51, a rectifier 52, load 53, the anode 37A and cathode 36A of silicon controlled rectifier 35A and a wire 54 to the other side of source 50. As described, this current will flow until the end of the half cycle for alternating current source 50.

During the same half cycle the very small value of current will flow from the left side of secondary winding 12 through wire 24B, resistor 23B, wire 21B, reactor winding 19B, wire 18B, winding 16B, wire 15B, resistor 25B and wire 13B to the right side of secondary winding 12. As described, this current flow assists the action of control windings 26B, 27B and 28B in resetting the flux level of reactor 20B.

Also, during this half cycle condenser 20B will discharge completely through resistor 23B.

In the next half cycle when the polarity of the dots become negative, the operation of the two circuits reverse.

Exciting current will now flow from the right side of secondary winding 12 through wire 13B, rectifier 14B, wire 15B, winding 16B, wire 18B, reactor winding 19B, wire 21B, resistor 23B, and wire 24B to the left side of secondary winding 12. As described, the flow of this exciting current continues until reactor 20B becomes saturated, at which time the surge of charging current for condenser 22B flows therethrough to reverse the flux in saturable current transformer 17.

The reversal of flux due to the flow of charging current through primary winding 16B induces a current pulse in winding 29B. The current flows from one side of secondary winding 29B through wire 30B, rectifier 31B, wire 32B to gate 34B of silicon controlled rectifier 35B. The current pulse flows back through cathode 36B and wire 38B to the other side of secondary winding 29B.

Silicon controlled rectifier 35B is made conductive.

Current thus flows from alternating current source 50 through wire 54, the anode 37B and cathode 36B of silicon controlled rectifier 35B, load 53, rectifier 55 and wire 51 back to source 50. As described, this current flows until the end of the half cycle.

During this half cycle, the very small current flows through wire 24A, resistor 23A, wire 21A, reactor winding 19A, wire 18A, primary winding 16A, wire 15A, resistor 25A and wire 13A to the negative side of secondary winding 12. As described, this assists control windings 26A, 27A and 28A in resetting the flux level in reactor 20A.

During this half cycle, condenser 22A discharges through resistor 23A.

It is to be noted that the flux in saturable current transformer 17 is reversed automatically by the action of the two primary windings 16A and 16B by their energization in the respective half cycles. Therefore, additional means to reverse the flux is not necessary as was in FIGURE 1.

Because of the possible damage to rectifiers 14A and 14B, a suppressor 56 is connected across the output of secondary winding 12. This suppressor consists of selenium rectifiers which prevents the flow of current therethrough until a high voltage pulse appears. If this were not present, these high voltage pulses would damage the rectifiers, but the suppressor allows the voltage pulses to decay and thereby eliminate the possibility of damage.

It is understood that two circuits of FIGURE 3 could be connected in the same symmetrical relationship as those of FIGURE 2 and thereby give the dual control with the simplicity of FIGURE 3 circuitry.

Although I have described my invention with a certain degree of particularity, it is understood that the above disclosure has been made only by way of example as required by law and that many changes in the details of circuitry may be resorted to by those skilled in the art without departing from the spirit and the scope of my invention as hereinafter claimed.

I claim:

1. A circuit for producing a pulse at any preselected instant during like polarity half cycles of an alternating current source comprising: a source of alternating current, a unidirectional conducting device, a transformer primary winding, a reactor winding and a condenser connected in a series circuit for current flow therethrough in one half cycle; a reactor having the reactor winding wound thereon; a transformer secondary winding coupled to the primary winding and connected to a load; means for making the reactor unsaturated limiting the current flowing through the circuit, and the current flowing through the reactor winding causes the reactor to become saturated whereby a high pulse of current flows through the circuit to charge the condenser and induce a current pulse in the secondary winding which flows through the load.

2. A pulse producing circuit as described in claim 1 wherein the transformer is saturable and has a second primary winding connected to the source of alternating current by a second unidirectional conducting device whereby the second primary winding is energized during the other half cycle to reset the transformer.

3. A pulse producing circuit as described in claim 2 wherein a third unidirectional conducting device is connected in series with the secondary winding to allow current flow to the load only during the one half cycle.

4. A pulse producing circuit as described in claim 1 wherein a resistor is connected in parallel with the condenser to discharge the condenser during the other half cycle.

5. A pulse producing circuit as described in claim 1 wherein the means for making the reactor unsaturated comprises a plurality of control windings wound on the reactor and each being energized from a separate direct current signal source and whereby the energization of any may be varied to change the instant the pulse occurs.

6. A circuit for producing a pulse at any preselected instant during the half cycles of an alternating current source comprising: two symmetrical circuits oppositely connected to the source, each circuit having connected in series a unidirectional conducing device, a transformer primary winding, a reactor winding and a condenser; each reactor winding wound on a separate reactor; the unidirectional conducting devices connected to allow current flow in one circuit during one half cycle and in the other circuit during the other half cycle of said current source; each primary winding associated with the same saturable transformer and each having a secondary winding connected by a unidirectional conducting device to a load; means for making the reactors unsaturated to initially limit the current flow in the circuit during its conducting half cycle, and the current flowing through the reactor winding causes the reactor to become saturated and a high pulse of current flows through the circuit to charge the condenser and induce a current pulse in the associated secondary winding whereby in one half cycle one load is energized with the pulse of current and in the other half cycle the other load is energized with the pulse of current.

7. A circuit for energizing the gate circuit of a silicon controlled rectifier to fire the silicon controlled rectifier at any preselected instant during like polarity half cycles of an alternating current source; the alternating current source, a unidirectional conducting device, a reactor winding, a resistor, and a transformer primary winding of a transformer connected in a series circuit for the flow of current therethrough in one half cycle; a secondary winding of the transformer connected to the gate circuit; a reactor having the reactor winding wound thereon; means for making the reactor unsaturated to limit the current flowing through the reactor winding, and the current flowing through the reactor winding causes the reactor to be saturated and a large current flows through the circuit and the primary winding whereby a current pulse is induced in the secondary winding and flows through the gate circuit to make the silicon controlled rectifier conductive.

8. A circuit for energizing the gate circuit of a silicon controlled rectifier to fire the silicon controlled rectifier comprising; a source of current, a transformer primary winding, a reactor winding, and a condenser connected in a series circuit for current flow therethrough; a reactor having the reactor winding wound thereon; a transformer secondary winding coupled to the primary winding and connected to the gate circuit; means for making the reactor unsaturated to limit the current flowing through the circuit, and the current flowing through the reactor winding causes the reactor to become saturated and a high pulse of current flows through the primary winding to charge the condenser and induce a current pulse in the secondary winding which flows through the gate circuit to make the silicon controlled rectifier conductive.

9. A circuit for energizing the gate circuit of a silicon controlled rectifier to fire the silicon controlled rectifier at any preselected instant during like polarity half cycles of an alternating current source; the source, a unidirectional conducting device, a condenser, a reactor winding, and a transformer primary winding connected in a series circuit for the flow of current therethrough in one half cycle; a transformer secondary winding coupled to the primary winding and connected to the gate circuit; a reactor having the reactor winding wound thereon; means for making the reactor unsaturated to limit the current flowing through the circuit, and the current flowing through the reactor winding causes the reactor to become saturated and a high pulse of current flows through the primary winding to charge the condenser and induce a current pulse in the secondary winding which flows through the gate circuit to make the silicon controlled rectifier conductive.

10. The energizing circuit as described in claim 9 wherein the transformer is saturable and has a second primary winding connected to the source of alternating current by a second unidirectional device whereby the second primary winding is energized during the other half cycle in a manner to reset the transformer.

11. The energizing circuit as described in claim 10 wherein a third unidirectional conducting device is connected in series with the transformer secondary winding to allow current to flow through the gate circuit during the one half cycle.

12. The energizing circuit as described in claim 9 wherein a resistor is connected in parallel with the condenser to discharge the condenser during the other half cycle.

13. The energizing circuit as described in claim 9 wherein the means for making the reactor unsaturated comprises a plurality of control windings wound on the reactor and whereby the preselected instant the gate circuit is energized may be changed by changing the energization of at least one of the control windings.

14. In a circuit for controlling the power conducted to a load comprising; a silicon controlled rectifier having a cathode, a anode and a gate; a first source of power connected in series with the load and the anode cathode circuit; a second source of power, a unidirectional conducting device, a reactor winding, a transformer primary winding, and a condenser connected in a series circuit for current flow therethrough; a reactor having the reactor winding wound thereon; a transformer secondary winding coupled to the primary winding and connected to the gate cathode circuit; means for making the reactor unsaturated to limit the current flowing through the circuit, and the current flowing through the reactor winding causes the reactor to become saturated and a high pulse of current flows through the primary winding to charge the condenser and induces a current pulse in the secondary winding which flows through the gate cathode circuit to fire the silicon controlled rectifier so it conducts power from the first source through the anode cathode circuit to the load.

15. A circuit for energizing the gate circuit of separate silicon controlled rectifiers and to alternately fire the silicon controlled rectifiers at any preselected instant during alternate half cycles of an alternating current source comprising two symmetrical circuits oppositely connected to the source; each circuit having connected in series a unidirectional conducting device, a transformer primary winding, a reactor winding and a condenser; each reactor winding wound on a separate reactor; the unidirectional conducting devices connected to allow current flow in one circuit during one half cycle and in the other circuit during the other half cycle; each primary winding associated with the same saturable transformer and each having a secondary winding connected by an additional unidirectional conducting device to the gate circuit of a different silicon controlled rectifier so current can flow thereto only when its primary winding is energized; means for making the reactors unsaturated to initially limit the current flow in the circuit during its conducting half cycle, and the current flowing through the reactor winding causes the reactor to become saturated and a high pulse of current flow through the primary winding to charge the condenser and induce a current in the associated secondary winding whereby in one half cycle current energizes one gate circuit to make that silicon controlled rectifier conductive and in the other half cycle current energizes the other gate circuit of the silicon controlled rectifier to make it conductive.

References Cited by the Examiner
UNITED STATES PATENTS

| | | | |
|---|---|---|---|
| 2,920,240 | 1/1960 | Macklem | 315—201 |
| 2,925,546 | 2/1960 | Berman | 321—25 |
| 3,067,378 | 12/1962 | Paynter | 321—45 X |
| 3,128,422 | 4/1964 | Brown. | |

OTHER REFERENCES

Magnetic Amplifier Triggers Silicon Controlled Rectifiers, published in Electrical Design News (June 1959), pages 20 and 21 relied on.

LLOYD McCOLLUM, *Primary Examiner.*

SAMUEL BERNSTEIN, *Examiner.*